(12) United States Patent
Gibby et al.

(10) Patent No.: US 8,302,005 B2
(45) Date of Patent: Oct. 30, 2012

(54) OPTIMIZING PLAYBACK OF MEDIA CONTENT

(75) Inventors: Lon Gibby, Colbert, WA (US); Paul Merchant, Spokane, WA (US)

(73) Assignee: Gibby Media Group, Spokane Valley, WA (US)

( * ) Notice: Subject to any disclaimer, the term of this patent is extended or adjusted under 35 U.S.C. 154(b) by 474 days.

(21) Appl. No.: 12/353,915

(22) Filed: Jan. 14, 2009

(65) Prior Publication Data

US 2010/0180201 A1  Jul. 15, 2010

(51) Int. Cl.
*G06F 3/00* (2006.01)
(52) U.S. Cl. ......................... 715/704; 715/716
(58) Field of Classification Search .................. 715/716, 715/704, 748–749; 709/226, 229
See application file for complete search history.

(56) References Cited

U.S. PATENT DOCUMENTS

| | | | |
|---|---|---|---|
| 7,343,414 B2 * | 3/2008 | Lipscomb et al. | ............ 715/716 |
| 7,384,723 B2 | 6/2008 | Kakuta et al. | |
| 7,390,546 B2 | 6/2008 | Yasuda | |
| 7,409,405 B1 * | 8/2008 | Masinter et al. | ............ 707/999.1 |
| 7,410,681 B2 | 8/2008 | Ohishi | |
| 7,480,872 B1 * | 1/2009 | Ubillos | ......................... 715/716 |
| 2005/0001931 A1 | 1/2005 | Kahn | |
| 2005/0138543 A1 * | 6/2005 | Liu | ............................... 715/513 |
| 2005/0168453 A1 * | 8/2005 | Ueda | ............................. 345/204 |
| 2006/0188173 A1 | 8/2006 | Zhang et al. | |

OTHER PUBLICATIONS

Dgital Photography News, The New Heir for Traditional DVD Media Bends The Rules, Without Breaking Them. Publication on Wednesday, Jul. 9, 2008, pp. 1-3.*

"The New Heir for Traditional DVD Media Bends the Rules, Without Breaking Them." <<http://lastminutephotographer.com/news/news.cfm/hurl/id%7C5903>> Retrieved on Dec. 15, 2008, 3 pages.

* cited by examiner

*Primary Examiner* — Weilun Lo
*Assistant Examiner* — Truc Chuong
(74) *Attorney, Agent, or Firm* — Lee & Hayes, PLLC

(57) ABSTRACT

A computer-readable storage medium stores media content in one or more formats and a media engine. The media engine includes a media player and a plurality of execution modules. Each execution module is specific to a different platform of multimedia device, such that the computer-readable storage medium is usable in a plurality of different multimedia device platforms.

21 Claims, 6 Drawing Sheets

OPTIMIZING PLAYBACK OF MEDIA CONTENT

BACKGROUND

Marketing seeks to direct advertising towards potential customers. Effective marketing relies on not only the contents of the marketing messages, but also the methods used to convey marketing messages to potential customers. Some studies have shown that marketing messages containing video and interactive presentations have a 60% greater response rate than traditional direct mail pieces.

Compact disks are one way to incorporate video into marketing messages. Many households have computers or multimedia players to access the video stored in compact disks. However, computers run under different operating systems, such as MICROSOFT WINDOWS® (produced by Microsoft Corporation of Redmond, Wash.), MAC OS® (produced by Apple Computer Inc. of Cupertino, Calif.), and LINUX (developed under the GNU Public License). Multimedia players may also have different platforms, such as digital versatile disk (DVD) players, BLU-RAY® players (BLU-RAY is a trademark owned by BLU-RAY Disk Association, University City, Calif.), or other video players. Typically, different systems and platforms cannot access content formatted for the other systems stored on the same compact disk. For example, marketing materials authored for the WINDOWS operating system may not be playable in a computer running another operating system, a DVD player, BLU-RAY player, or video player. This incompatibility means that marketing materials may not be viewable by some recipients, thereby diminishing the effectiveness of the marketing materials.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, this disclosure describes playback of media content in multiple different platforms of multimedia devices. In one aspect, playback on multiple different platforms of multimedia devices may be facilitated using a computer-readable storage medium storing media content in one or more formats and a media engine. The media engine includes a media player and a plurality of execution modules. Each execution module is specific to a different platform of multimedia device, such that the computer-readable storage medium is usable in a plurality of different multimedia device platforms.

BRIEF DESCRIPTION OF THE DRAWINGS

In the figures, the left-most digit of a reference number identifies the figure in which the designated component or act first appears.

DETAILED DESCRIPTION

Overview

As discussed above, different systems and platforms of media players typically cannot access video stored in different formats. To effectively direct advertising towards more potential customers, marketing materials should be easily played back on whatever system and platform of playback device the customer happens to have. The playback of marketing video should also optimize display settings, such as screen size, aspect ratio, and refresh rate, to those suited for the playback device so that potential customers have a good playback experience. Also, after the playback of marketing video, the original display settings of the playback device should be restored.

This disclosure describes playback of media content stored in a storage medium in multiple different platforms of multimedia devices. While the media content is described in the context of marketing video, this disclosure also applies to other types of media content (e.g., movies, music, games, articles, and other audio, video, and/or textual content). The storage medium comprises a self-contained media engine which is able to decode video and audio contents, so that any installation of software separately on the multimedia devices is unnecessary. Furthermore, the media engine comprises all necessary execution files so that the media content stored in the same storage medium can be played back in any computer including, for example, those using WINDOWS, APPLE, or LINUX operating systems. The media content can also be authored to be playable on DVD players, audio CD players, BLU-RAY disk players, and potentially other types of players.

Illustrative System for Playback of Media Content

Figure 1:
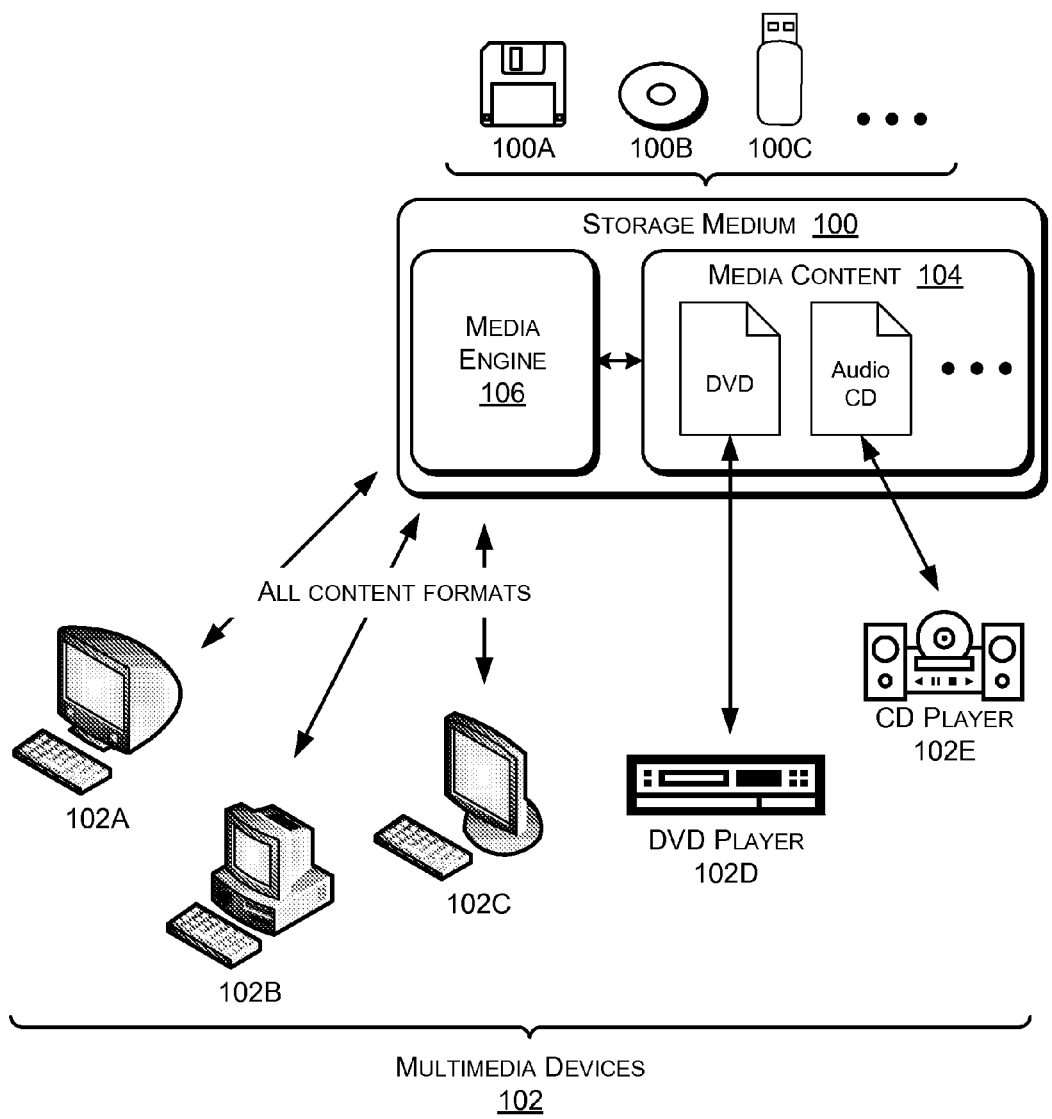
FIG. 1 is a block diagram of an illustrative system facilitating playback of media content in multiple different multimedia players.

FIG. 1 is a block diagram of an illustrative system allowing a storage medium 100 to be playable in multiple different multimedia players 102. As shown in FIG. 1, the storage medium 100 may comprise any suitable computer-readable storage medium such as, for example, a magnetic disk 100A, an optical disk 100B, a memory stick 100C, or other non-volatile memory. Examples of multimedia devices 102 in which the storage medium 100 is playable, include personal computers (PCs) running the WINDOWS operating system 102A, an APPLE operating system 102B, or another proprietary operating system, a PC running a Linux operating system 102C or other open source operating system, a console DVD player 102D, and an audio CD player 102E.

The storage medium 100 includes media content 104 authored for playback on one or more multimedia devices, and a media engine 106 to facilitate playback of the media content on other multimedia devices. In the illustrated example, the storage medium 100 includes media content 104 authored for playback in a DVD player 102D and content authored for playback in an audio CD player 102E. The storage medium also includes a media engine 106 that facilitates playback of the media content 104 in a WINDOWS PC 102A, an APPLE PC 102B, and a LINUX PC 102C.

Figure 2:
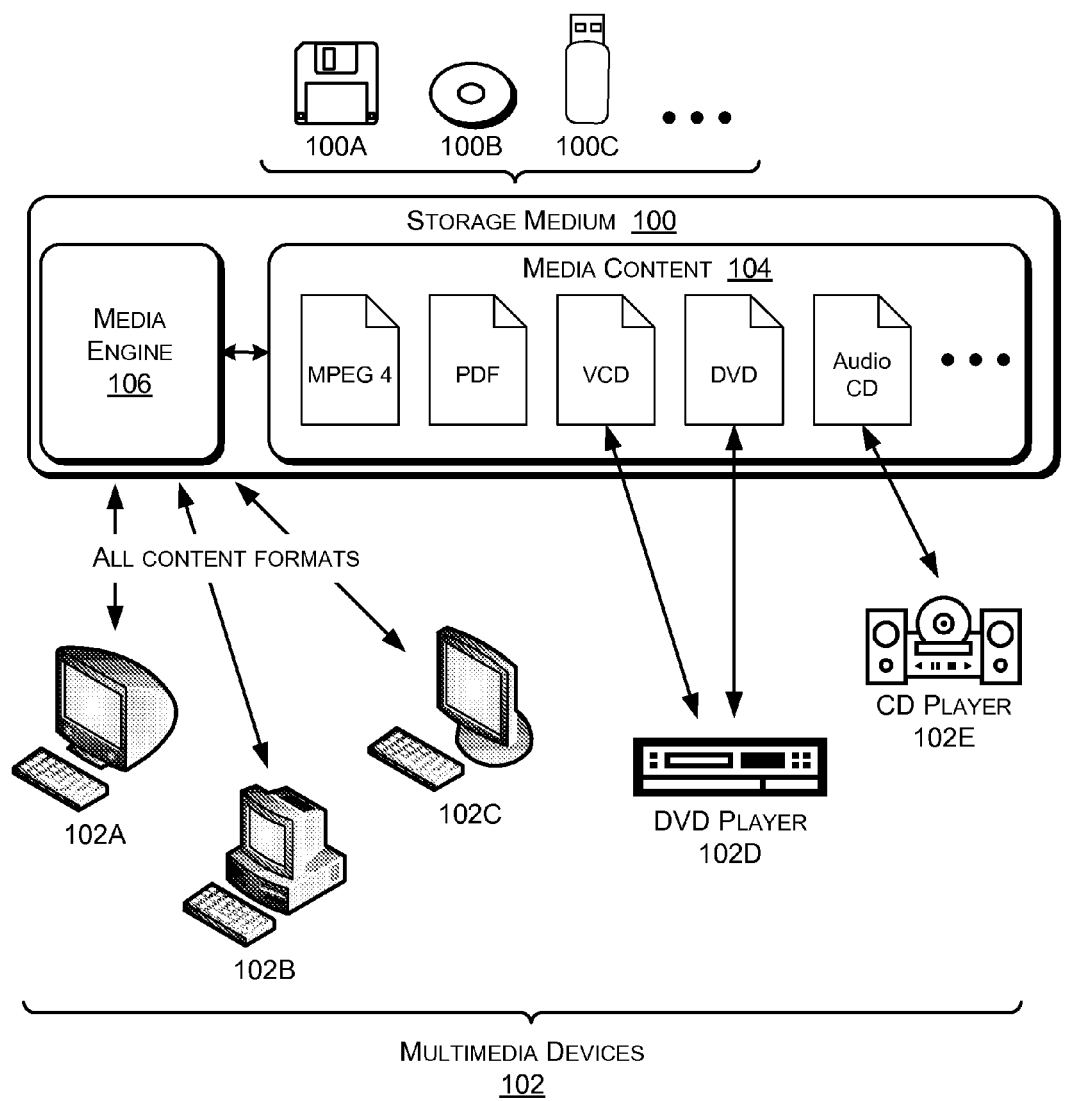
FIG. 2 is a block diagram of another illustrative system facilitating playback of media content in multiple different multimedia players, in which the content is stored in multiple different formats.

FIG. 2 is a block diagram of another illustrative system facilitating playback of media content in multiple different multimedia players, in which the content is stored in multiple different formats. In this example, the storage medium includes media content 104 authored in Moving Pictures Experts Groups 4 (MPEG-4) format, portable document format (PDF), video compact disk (VCD) format, DVD format, Audio CD format, and potentially other formats. In some instances, the different formats may represent copies of the same content (e.g., a movie encoded in both DVD and VCD formats). In other instances, the different formats may represent copies of different content (e.g., a movie encoded in DVD format, a movie soundtrack in Audio CD format, and a review of the movie in PDF format).

In both FIGS. 1 and 2, the media engine 106 facilitates playback of the media content 104 on the PCs 102A-102C, regardless of whether the content 104 was authored in a format supported by the specific PCs.

Figure 3:
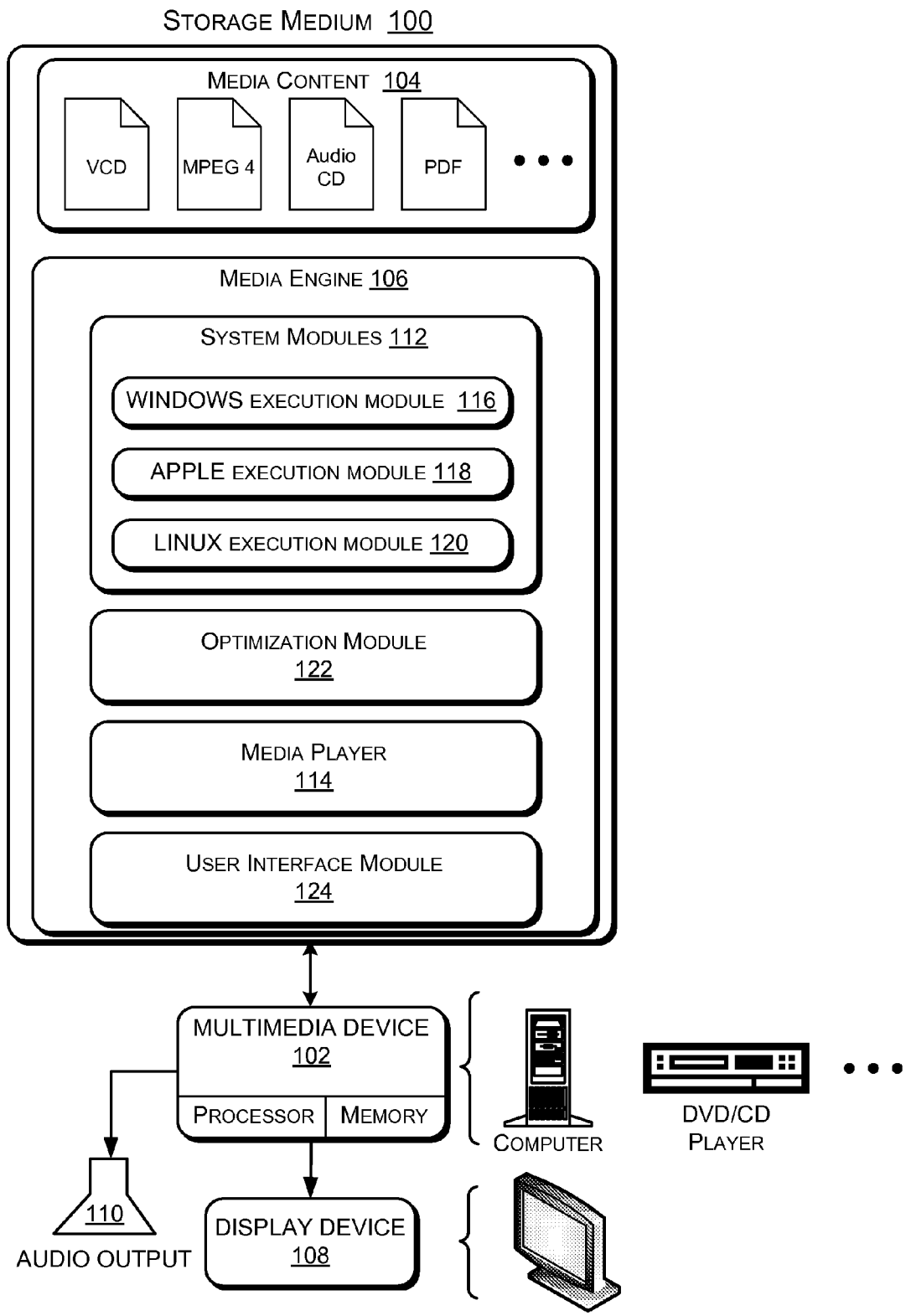
FIG. 3 is a block diagram showing details of an illustrative storage medium facilitating playback of media content on multiple different multimedia device platforms.
Figure 4:
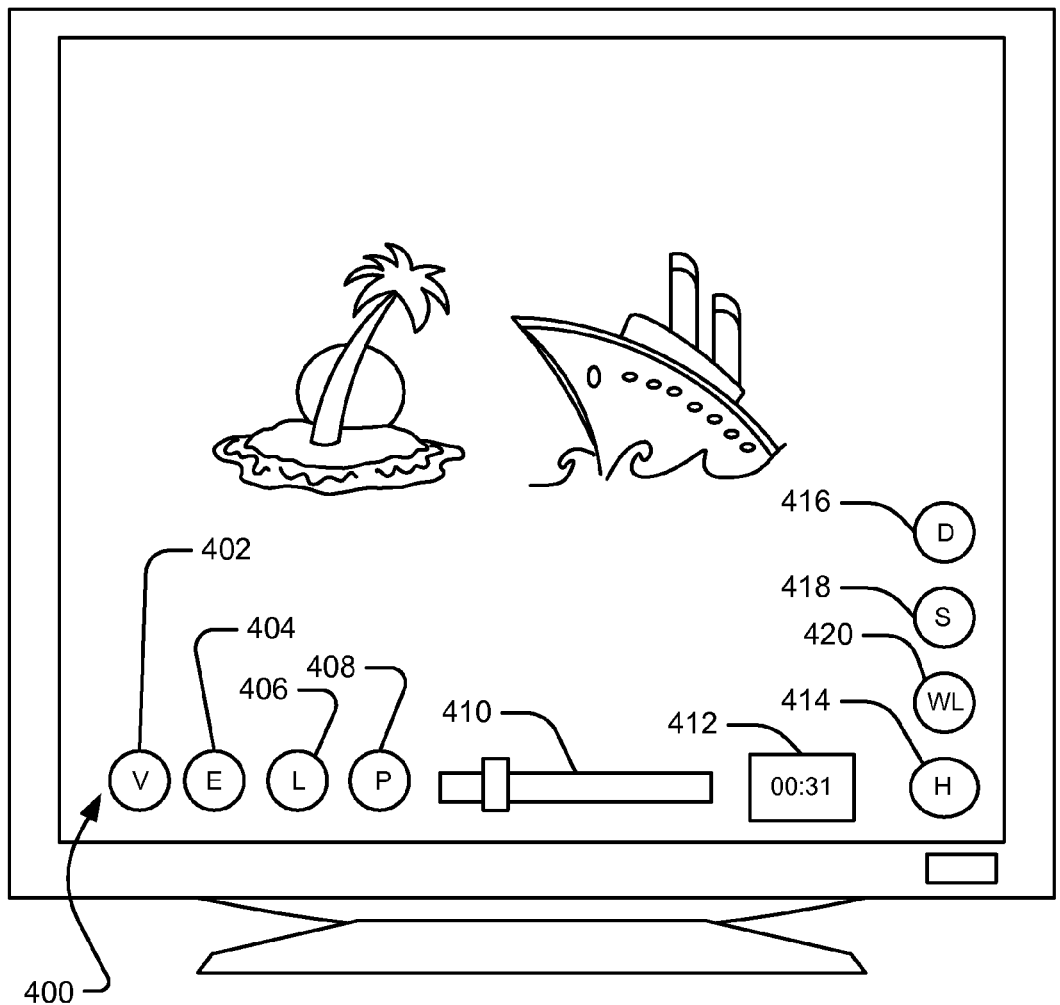
FIG. 4 is a schematic diagram showing an illustrative user interface shown in a display device.

FIG. 3 is a block diagram showing details of the illustrative storage medium 100 facilitating playback of media content on multiple different multimedia device platforms 102. As mentioned above, the storage medium 100 can be an optical disk (such as a CD, digital versatile disk (DVD), BLU-RAY disk, high density DVD, etc.), non-volatile memory (such as flash memory), a floppy diskette, or any other computer-readable media. In the case of an optical disk, the disk can be any size of disk. For example, suitable disks may have a diameter of about 120 millimeters, 80 millimeters, 60 millimeters, or any other diameter playable in a music or video disk player. Alternatively, instead of being circular, disks may be square, rectangular, or any other custom shape. Also, suitable disks may have any suitable thickness. In several examples, disks according to this disclosure may be about 1.2 millimeters, 0.5 millimeters, 0.09 millimeters, or any other thickness playable in a music or video disk player.

In one specific example, optical disks may have a thickness of at least about 0.6 and at most about 0.8 millimeters. In some examples, the disk may have sufficient flexibility to allow the disk to be bent such that two points located at opposite ends of a diameter of the disk touch each other without breaking the disk or damaging data stored on the disk.

The size and type of disk used may vary depending on, among other things, the amount of storage space needed for a given application. With the current video compression technology, and the like. A 60-millimeter disk can store more than 18-minutes of compressed high-quality video, which can convey long enough marketing messages to potential customers. A double-layer DVD disk can store more than four hours of video or eighteen hours of CD-quality audio. A BLU-RAY disk can store four times more information than a DVD disk.

FIG. 3 also depicts a multimedia device 102 to access the storage medium 100. The multimedia device 102 is connected to a display device 108 and an audio output device 110 to allow users to view and listen to the playback of the media content 104. The multimedia device 102 can be a computer, a video player, an audio player, or a combination thereof. In some implementations, the multimedia device 102 may be an audio only device (e.g., a CD player) or a video only device (e.g., a projector).

As mentioned above, the storage medium 100 comprises media content 104 and a media engine 106. The media engine 106 comprises system modules 112, and a media player 114, which collectively allow playback of the media content 120 on a variety of different PC-based multimedia players 102. The media content 104 contains media files, such as, for example, video files, audio files, textual content, interactive media files, slide presentation files, and website links. The video files can be in any desired format such as, for example, AVI (Audio Video Interleave File), MPG (MPEG 1 System Stream), DAT (Data), WMV (Windows Media Video File), MOV (QuickTime Video Clip), MP4 (MPEG-4 Video File), and 3GP (3rd Generation Multimedia File). The video files may be grouped under a directory. In the case of a DVD, they may be grouped under the directory VIDEO_TS. In the case of a Video CD (VCD), they may be grouped under the directory MPEGAV. The audio files can be in any audio format, such as, for example, MP3 (MPEG Audio Stream, Layer III), WAV (Waveform Audio), WMA (Windows Media Audio File) and OGG (Ogg Vorbis Codec Compressed Multimedia File).

In the illustrated example, the system modules 112 comprise a plurality of execution modules, including a WINDOWS execution module 116, an APPLE execution module 118, and a LINUX execution module 120. The media player 114 may comprise a video decoder and/or an audio decoder to decompress the video files and/or audio files. In other examples, the system modules 140 may include executable files for one or more other operating systems and/or player modules for other types of multimedia devices.

The WINDOWS execution module 116 comprises a list of commands to allow a computer with a WINDOWS operating system to execute commands and decode the video files and audio files using the media player 114. The WINDOWS execution module 116 may also include an auto execution command, so that a user can immediately view the video without any keyboard or mouse clicks once the storage medium 100 is put into the multimedia device 102. Similarly, the APPLE execution module 118 and the LINUX execution module 120 comprise lists of commands to allow a computer with an APPLE or LINUX operating system, respectively, to execute commands and decode media content files using the media player 114.

In some implementations, the media content 104 may be authored according to one or more specifications to include certain settings, commands, files and directories to facilitate playback of the media content 104 on a video player (e.g., DVD, BLU-RAY, VCD players, etc.), audio player (e.g., a CD player), or other standalone multimedia devices. Examples of standalone multimedia devices include, without limitation, console devices, portable devices, in-car devices, and the like. Take the playback of VCD video as an example. The media content 104 may contain directories, such as CDI, EXT, SEGMENT and VCD with necessary files in each directory. In some situations, segmentation of regions of the storage medium 100, with each region storing different media content, may be used to allow the storage medium to be played back in multiple platforms. The techniques of authoring content according to one or more specifications and/or segmenting regions of the storage medium may be implemented in combination with the media engine 106 to allow the storage medium 100 to be played back in a plurality of different PCs and standalone multimedia devices.

In the illustrated example, in addition to the media player 114, the media engine 106 also includes an optimization module 122 and a user interface module 124. The optimization module 122 contains commands to determine existing display settings of the display device 108 coupled to the multimedia device 102 before playback of the media content 104 on the storage medium 100. The display settings may include a resolution setting of the display device, an aspect ratio of the display device, a frame rate of the display device, a refresh rate of the display device, a font type, a font size, or the like. In some implementations, display settings may also include contrast, brightness, sharpness, or other common screen settings.

The optimization module 122 also contains commands to store the current display settings of the display device 108, so that the display settings can be restored after the playback of the media content 104. Generally, the optimization module 122 stores the display settings in memory of the multimedia device 180. However, in other implementations (e.g., when the storage medium is rewriteable), the display settings may be stored in memory of the storage medium 100.

When the storage medium is inserted in a drive of a PC multimedia device, the PC will execute (either automatically or otherwise) the execution module (116-120) corresponding to the operating system running on the PC. The execution module then loads the optimization module 122. Once the display settings have been adjusted, the execution module then loads the media player 114. Loading the media player may include starting a virtual machine, including a dedicated operating system on which the media player 114 runs.

The media player 114 contains commands to play back the media content 104 on the multimedia device 102 using predetermined display characteristics based on the video display settings. When the media content 104 comprises video files, the media player 114 may optimize the width, height, resolution, aspect ratio, frame rate, refresh rate, font type, font size, and/or other characteristics of a playback region shown on the display device 108. In some implementations, when the media content 120 comprises audio files, the playback module 164 may also optimize audio quality, volume (e.g., normalize playback volume), and/or other audio characteristics for playback on the audio output device 184.

Following conclusion of playback of the media content 104 (upon reaching the end of the content, in response to a user request to end playback, and/or upon the passage of a predetermined time period), the execution module and/or the media player 156 exits playback and reloads the optimization module 122. The optimization module 122 contains commands to read the stored display settings from memory and restore the display settings of the display device 108 to their settings prior to adjustment by the optimization module 122. As used herein, the term playback is not limited to playback of an audio and/or video clip, and may also include, for example, display of text or images, display of a navigation menu, display of an interactive presentation, or the like.

The user interface module 124 contains commands to present a user interface usable to control playback of the media content 104, connect to the Internet, open other documents and/or websites via links, or otherwise allow a user to interact with the multimedia device 102 or the media content 104. In some implementations, the user interface may comprise a substantially transparent or translucent navigation bar.

FIG. 2 is a schematic diagram illustrating one illustrative example user interface 200 that may be presented by the user interface module 124. In this example, the user interface 200 is overlaid on top of a portion of the content being played back. The user interface 200 is substantially transparent so that the user can watch the video or other content and at the same time has some controls over the playback of the video or other content. When the user moves a cursor over the user interface, it becomes translucent so that the user can select one or more controls of the user interface. Thus, the user interface 200 allows the user to control playback of the content interactively.

The user interface 200 may have a variety of control buttons, of which those shown in FIG. 2 are merely illustrative. In the illustrated example, a volume button 202 allows the user to control the audio volume. An exit button 204 allows the user to exit content playback. A loop button 205 allows the user to replay content. A pause button 206 allows the user to pause content playback. A seek slider 208 allows the user to seek a particular video playback timing. A time button 210 allows the user to view the current playback duration (i.e., elapsed time) of the video. Alternatively, the time button 210 may display a remaining playback time, or may toggle between elapsed and remaining time. A hide button 212 allows the user to hide the user interface 200. A document button 214 allows the user to access related documents (e.g., supporting documents, forms, audio or video recordings on related topics, still images or slideshows, etc.) on the storage medium 100 and/or stored remotely and accessible over a network such as the Internet. A slide button 216 allows the user to view marketing slide presentations, which may also be provided on the storage medium or at a remote location accessible via a network. A link button 218 allows the user to view related website links.

Illustrative Distribution of Storage Medium

Figure 5:
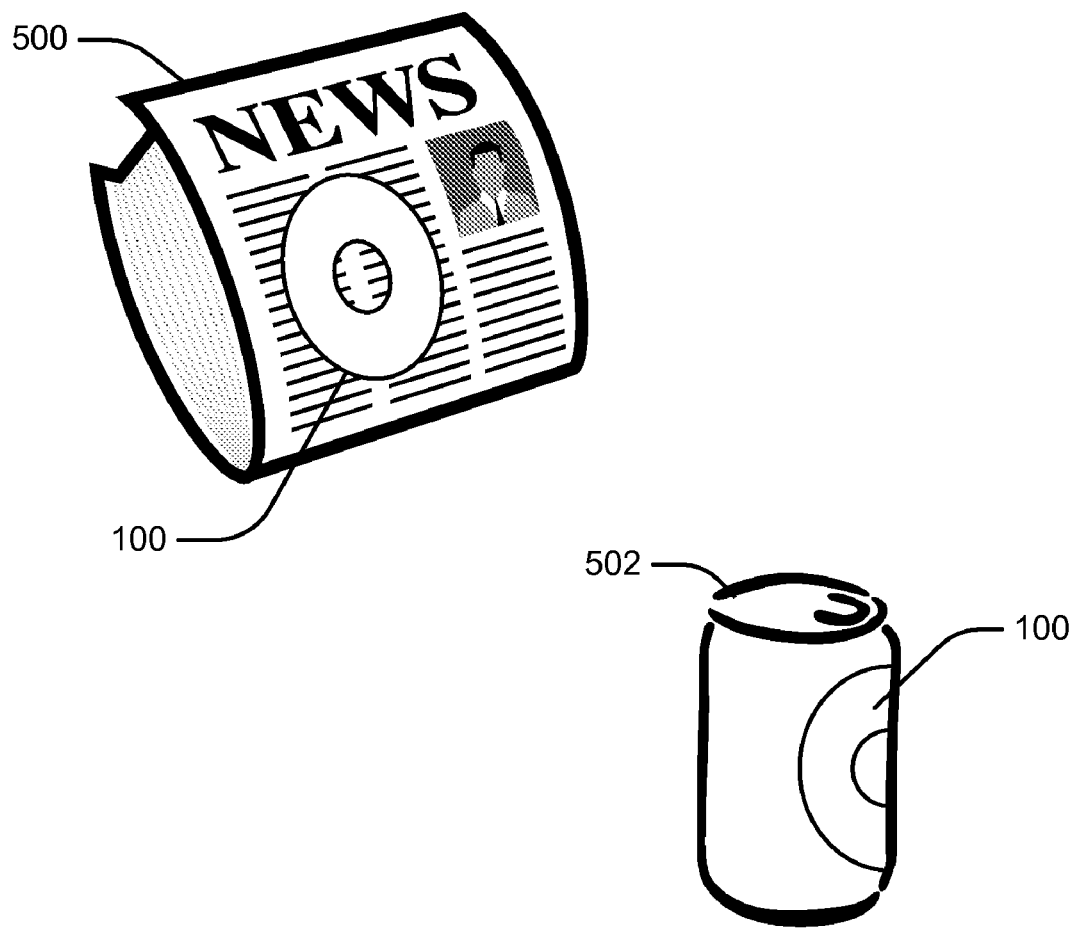
FIG. 5 is a schematic diagram showing an illustrative system including a delivery medium with a storage medium coupled thereto.

The storage medium 100 can be used for many applications. FIG. 5 depicts several illustrative applications of an optical disk storage medium. In some implementations, the storage medium 100 may comprise a standard CD or DVD having a thickness of about 1.2 millimeters. However, in other implementations, a thinner optical disk may be used, having a thickness of, for example, about 0.6 to about 0.8 millimeters. Such a thin disk can be manufactured while the embedded data is still accessible by any conventional multimedia devices. Such a thin and flexible disk is very useful for marketing. The disk can be bent to an extent that two rims located at two opposite ends of a diameter of the disk can touch each other. Therefore, the disk is supple enough to run through mail-sorting machines and can be attached or laminated to a page 500 of a magazine, newspaper, or (shown in FIG. 5) any other printed publication. The thin disk is also eco-friendly, requiring less plastic and lacking harmful bonder resins. The thin disk, even with a smaller diameter, can hold information equivalent to a regular catalog.

The thin disk can be also used for promotion of other merchandise. In another example shown in FIG. 5, a thin disk is coupled to a beverage container for distribution. Since the thin disk is flexible and squeezable, it can be attached or laminated to a bottle, can, or other drink container 502 (also shown in FIG. 5). The consumer can remove the thin disk and put it into any supported multimedia player and view the media content stored thereon. This allows advertisers to communicate messages effectively to customers through a different channel.

Illustrative Method for Playback of Media Content

Figure 6:
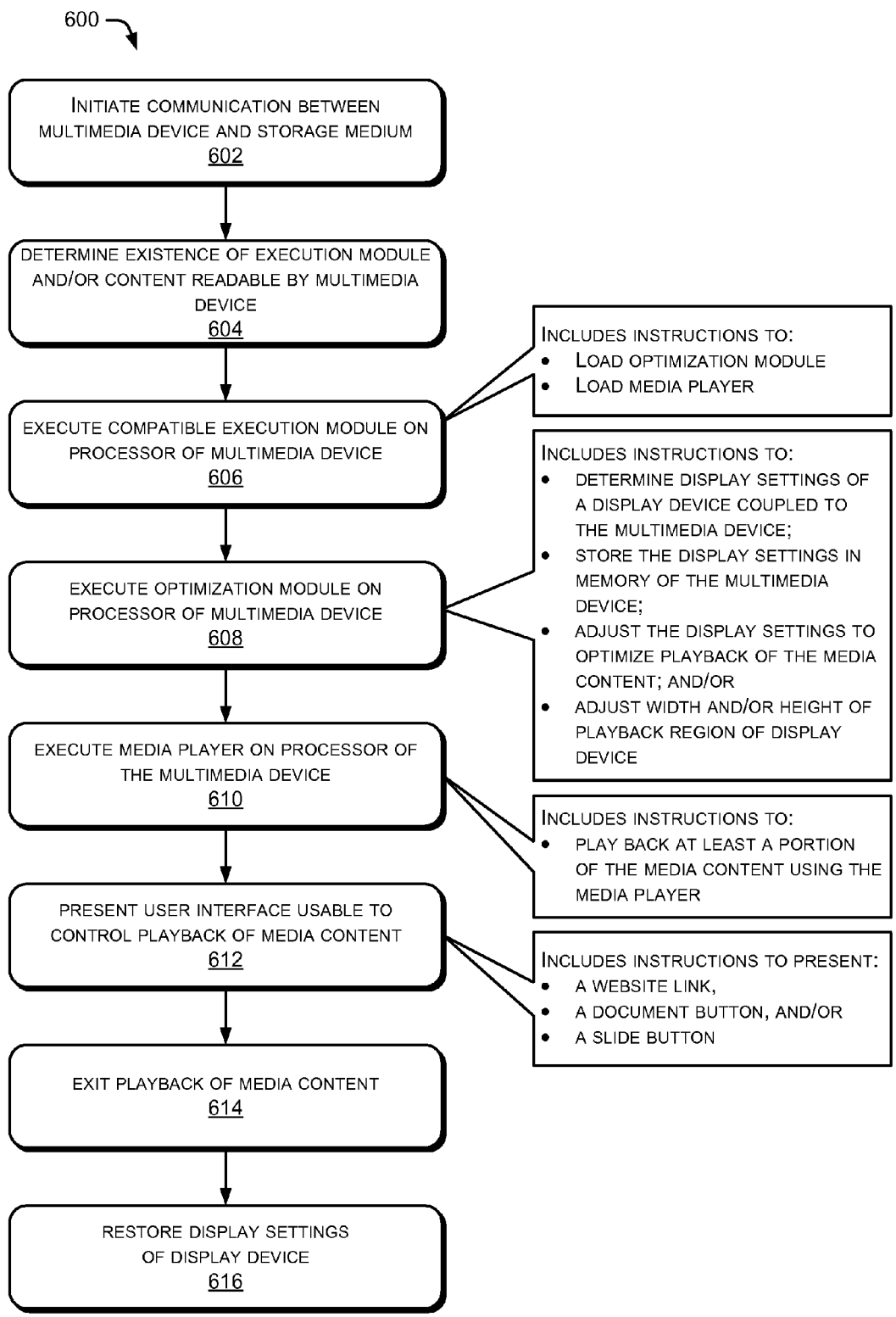
FIG. 6 is a flowchart showing an illustrative method of playback of media content on a multimedia device.

FIG. 6 is a flowchart showing an illustrative method 600 of playback of media content. The method 600 includes particular steps described in a particular order of execution. However, other methods respectively including other steps, and/or omitting one or more of the depicted steps, and/or proceeding in other orders of execution may also be used in accordance with the present teachings. Therefore, the method 600 is illustrative and non-limiting with respect to the operations contemplated by the present teachings. The method 600 is described with reference to the illustrative storage medium 100 for illustration. However, the method may be practiced with other storage mediums, and the storage medium 100 may be used to practice other methods.

At 602, the multimedia device 102 initiates electronic communication with the storage medium 100. At this stage, the multimedia device 102 "detects" the presence of the storage medium 100 (e.g., in a disk drive, serial port, or other input of the multimedia device 102).

At 604, the multimedia device 102 determines whether data on the storage medium 100 is readable by the multimedia device 102. In the case of a PC multimedia device, the operating system of the PC checks to determine if the storage medium 100 contains a recognized configuration or execution modules (e.g., WINDOWS, APPLE, or LINUX files). In the case of a standalone multimedia device, the console player determines whether the storage medium 100 contains media content in a recognized file format (e.g., CD, DVD, BLU-RAY, VCD, etc.).

In the case of a PC multimedia device, at 606, a compatible execution module (e.g., WINDOWS, APPLE, LINUX, or other operating system) of the system modules 112 is used to load the optimization module 122 and the media player 114. Thus, the media content 104 is playable on multiple different platforms of multimedia devices for which the storage medium 100 includes an execution module compatible with an operating system of the multimedia device and/or content authored in a format readable by the multimedia device.

In the case of a PC multimedia device, at 608, the optimization module 122 is loaded and executed on a processor of the multimedia device. Execution of the optimization module 122 determines current display settings of the multimedia device 102 and/or its associated display device 108. For example, the optimization module 122 may determine that, among other display settings, the display device 108 has a 4:3 aspect ratio and a resolution of 1024×768 pixels. The optimization module 122 then stores the display settings of the display device 108, so that the display settings can be restored after the playback of the media content 104. The optimization module 122 then adjusts the display settings to optimize playback of the media content using predetermined display characteristics based on the video display settings. For example, the media content 104 may be recorded in a 16:9 aspect ratio at a resolution of 1680×1050 pixels. The optimization module 122 may adjust the width, height, resolution, aspect ratio, frame rate, refresh rate, font type and/or font size of a playback region shown on the display device 108 to present the media content 104 to a user. In various examples, the optimization module 122 may set the display device 108 to match the display characteristics of the media content, may lower a display resolution, may maximize a display resolution, or may otherwise alter some or all of the display characteristics. In one specific example, the optimization module 122 may set the display device 108 to lower the display resolution to a minimum threshold. By lowering the display resolution, the media content is able to be played back without stuttering or pausing to refill a playback buffer. The lower display resolution increases the user's perceived resolution and quality of the video, because the video is no longer being stretched over as many pixels.

At 610, the execution module and/or optimization module 122 loads the media player 114 to initiate playback of at least a portion of the media content 104. At 612, the media player 114 loads a user interface module 124, which executes on the processor of the multimedia device 102 to present a user interface 400 to a user. The user interface includes, among other things, playback controls, one or more web links to content on the Internet, one or more document buttons to access one or more related documents or files, and one or more slide buttons to access one or more related slide presentations.

Upon completion of playback (e.g., end of the media content, user initiated ending, or expiration of a predetermined time period), at 614, the media player 114 exits playback of the media content and reloads the optimization module 122. At 616, the optimization module 122 restores the display settings of the multimedia device 102 and/or display device 108 to those settings stored in memory prior to playback.

The storage medium 100 is self-contained, in that it does not write any data or rely on programs stored on the multimedia device 102 for operation. Thus, the storage medium 100 can be used in many different computers and players. Since the storage medium 100 comprises a self-contained media engine, which is able to decode video and audio contents, any installation of software separately on the multimedia devices is unnecessary. Furthermore, the storage medium 100 comprises system modules, which incorporate all necessary execution files so that the media content stored on the same storage medium can be played back in any computer using WINDOWS, APPLE, LINUX, and potentially other operating systems. Still further, the storage medium 100 may also include the media content stored in multiple different formats to be readable by DVD players, audio CD players, BLU-RAY disk players, and potentially other types of multimedia players.

Conclusion

Although the subject matter has been described in language specific to structural features and/or methodological acts, the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A non-transitory read-only computer-readable storage medium comprising:
    media content, the media content comprising multiple versions of the media content encoded in a plurality of different formats; and
    a self-contained media engine including a media player and a plurality of execution modules, each execution module being specific to a different platform of multimedia device,
    wherein the self-contained media engine includes instructions that, when executed by a processor of a multimedia device, facilitate playback of media content on the multimedia device using the media player, regardless of whether the media content is stored in a format supported by the multimedia device, by performing acts comprising:
        automatically determining a compatible execution module that is readable by the multimedia device, from among the plurality of execution modules stored on the storage medium, the plurality of execution modules being stored on the storage medium prior to the determination;
        executing the compatible execution module on the processor of the multimedia device; and
        playing back at least a portion of the media content using the media player of the self-contained media engine without installation of software on the multimedia device, the portion of the media content being encoded in a format of the plurality of different formats that is compatible with the media player; and
    wherein the non-transitory read-only computer-readable storage medium comprises an optical disk having a thickness of at least about 0.6 and at most about 0.8 millimeters, and has sufficient flexibility to allow the disk to be bent such that two points located at opposite ends of a diameter of the disk touch each other without breaking the non-transitory read-only computer-readable storage medium or damaging data stored on the non-transitory read-only computer-readable storage medium.

2. The non-transitory read-only computer-readable storage medium of claim 1, wherein the self-contained media engine further comprises an optimization module including instructions that, when executed by the processor of the multimedia device, perform acts comprising:
    determining display settings of a display device coupled to the multimedia device;
    storing the display settings of the display device in memory of the multimedia device; and
    adjusting one or more display settings of the multimedia device to optimize playback of the media content.

3. The non-transitory read-only computer-readable storage medium of claim 2, wherein the optimization module further includes instructions that, when executed by the processor of the multimedia device, perform acts comprising:
    adjusting a width and/or height of a playback region shown on the display device.

4. The non-transitory read-only computer-readable storage medium of claim 2, wherein the optimization module further includes instructions that, when executed by the processor of the multimedia device, perform acts comprising:
    exiting the playback of the media content; and
    restoring the display settings of the display device to the stored display settings stored in memory of the multimedia device.

5. The non-transitory read-only computer-readable storage medium of claim 2, wherein the display settings comprise one or multiple elements selected from the group consisting of resolution, aspect ratio, frame rate, refresh rate, and font size.

6. The non-transitory read-only computer-readable storage medium of claim 1, wherein the one or more storage media comprise an optical disk.

7. The non-transitory read-only computer-readable storage medium of claim 1, wherein the one or more storage media comprise non-volatile memory.

8. The non-transitory read-only computer-readable storage medium of claim 1, wherein the self-contained media engine further comprises a user interface module comprising instructions that, when executed by the processor of the multimedia device, perform acts comprising:
    presenting a graphical user interface usable to interact with the media player to control playback of the media content.

9. The non-transitory read-only computer-readable storage medium of claim 8, wherein the user interface module further includes instructions that, when executed by the processor of the multimedia device, perform acts comprising:
    presenting a website link usable to access a website during the playback of the media content.

10. The non-transitory read-only computer-readable storage medium of claim 8, wherein the user interface module further includes instructions that, when executed by the processor of the multimedia device, perform acts comprising:
    presenting a document button to allow the user to access a document during the playback of the media content.

11. The non-transitory read-only computer-readable storage medium of claim 8, wherein the user interface module further includes instructions that, when executed by the processor of the multimedia device, perform acts comprising:
    presenting a slide button to allow the user to access a slide presentation during the playback of the media content.

12. The non-transitory read-only computer-readable storage medium of claim 1, wherein the plurality of different formats include one or more of the following: video compact disk format, compact disk audio format, digital versatile disk format, portable document format, MPEG-1, MPEG-2, and MPEG-4.

13. A method of playback of media content stored on a non-transitory computer-readable storage medium by a multimedia device, wherein the storage medium is removable and distinct from storage components of the multimedia device, the method comprising:
    initiating electronic communication between the multimedia device and a self-contained media engine stored on the storage medium;
    automatically determining a compatible execution module, from among a plurality of execution modules stored on the storage medium, that is readable by the multimedia device;
    executing, directly from the storage medium, the compatible execution module on a processor of the multimedia device, the compatible execution module including instructions to execute a media player of the self-contained media engine stored on the storage medium;
    executing the media player on the processor of the multimedia device to playback the media content in response to the instruction from the compatible execution module;
    playing back at least a portion of the media content using the media player of the self-contained media engine stored on the storage medium without installation of software on the multimedia device; and
    wherein the non-transitory computer-readable storage medium comprises an optical disk having a thickness of at least about 0.6 and at most about 0.8 millimeters, and has sufficient flexibility to allow the disk to be bent such that two points located at opposite ends of a diameter of the disk touch each other without breaking the non-transitory computer-readable storage medium or damaging data stored on the non-transitory computer-readable storage medium.

14. The method of claim 13, wherein the compatible execution module further includes instructions to load an optimization module prior to loading the media player, such that prior to playing back media content, the method includes:
    executing an optimization module stored on the storage medium on the processor of the multimedia device, the optimization module:
    determines display settings of a display device coupled to the multimedia device;
    stores the display settings of the display device in memory of the multimedia device; and
    adjusts one or more display settings of the multimedia device to optimize playback of the media content.

15. The method of claim 14, wherein subsequent to playing back the media content, the optimization module further:
    exits the playback of the media content; and
    restores the display settings of the display device to the stored display settings stored in memory of the multimedia device.

16. The method of claim 14, wherein the display settings comprise one or multiple elements selected from the group consisting of resolution, aspect ratio, frame rate, refresh rate, and font size.

17. The method of claim 14, wherein the optimization module further adjusting a width and/or height of a playback region shown on the display device.

18. A system comprising:

a delivery medium; and a non-transitory computer-readable storage medium removably coupled to the delivery medium, wherein the non-transitory computer-readable storage medium comprises an optical disk having a thickness of at least about 0.6 and at most about 0.8 millimeters, and has sufficient flexibility to allow the disk to be bent such that two points located at opposite ends of a diameter of the disk touch each other without breaking the non-transitory computer-readable storage medium or damaging data stored on the non-transitory computer-readable storage medium and the non-transitory computer readable-storage medium comprising:

media content encoded in a plurality of different formats;

a self-contained media engine including a media player and a plurality of execution modules, each execution module being specific to a different platform of multimedia device, such that the computer-readable storage medium is usable in a plurality of different multimedia device platforms, the self-contained media engine comprising instructions that, when executed by a processor of the multimedia device, perform acts comprising:

automatically determining a compatible execution module that is readable by the multimedia device, from among the plurality of execution modules;

executing the compatible execution module on the processor of the multimedia device; and playing back at least a portion of the media content on the multimedia device using the media player, regardless of whether the media content is stored in a format supported by the multimedia device and without installation of software on the multimedia device; and an optimization module including instructions that, when executed by the processor of the multimedia device, perform acts comprising:

determining display settings of a display device coupled to the multimedia device;

storing the display settings of the display device in memory of the multimedia device; and adjusting one or more display settings of the multimedia device to optimize playback of the media content.

19. The system of claim 18, wherein the plurality of different multimedia device platforms in which the computer-readable storage medium is usable includes: personal computers running a proprietary operating system, personal computers running an open source operating system, console digital versatile disk players, and audio compact disk players.

20. The system of claim 18, wherein the delivery medium comprises a printed publication.

21. The system of claim 18, wherein the delivery medium comprises a beverage container.

* * * * *